US010461919B2

(12) United States Patent
McAllister et al.

(10) Patent No.: US 10,461,919 B2
(45) Date of Patent: *Oct. 29, 2019

(54) SYNCHRONOUS TRANSFER OF STREAMING DATA IN A DISTRIBUTED ANTENNA SYSTEM

(71) Applicant: CommScope Technologies LLC, Hickory, NC (US)

(72) Inventors: Donald R. McAllister, Lynchburg, VA (US); Christopher Goodman Ranson, Concord, VA (US); Fred William Phillips, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,541

(22) Filed: Jul. 16, 2018

(65) Prior Publication Data
US 2018/0343106 A1    Nov. 29, 2018

Related U.S. Application Data

(63) Continuation of application No. 15/589,377, filed on May 8, 2017, now Pat. No. 10,027,469, which is a
(Continued)

(51) Int. Cl.
*H04L 7/00* (2006.01)
*H04J 3/06* (2006.01)
(Continued)

(52) U.S. Cl.
CPC .......... *H04L 7/0087* (2013.01); *H04J 3/0658* (2013.01); *H04L 1/0625* (2013.01);
(Continued)

(58) Field of Classification Search
CPC .... H04J 3/0658; H04L 7/0087; H04L 1/0631; H04L 7/033; H04W 88/085
(Continued)

(56) References Cited

U.S. PATENT DOCUMENTS 4,397,017 A    8/1983  Rokugo
4,764,941 A    8/1988  Choi
(Continued)

FOREIGN PATENT DOCUMENTS

CN    2595091         12/2003
CN    101422005 A      4/2009
(Continued)

OTHER PUBLICATIONS

European Patent Office, "Extended European Search Report from EP Application No. 18200679.1 dated Jan. 23, 2019", from Foreign Counterpart to U.S. Appl. No. 13/076,002, Jan. 23, 2019, pp. 1-9, Published: EP.
(Continued)

*Primary Examiner* — Juan A Torres
(74) *Attorney, Agent, or Firm* — Fogg & Powers LLC

(57) ABSTRACT

A system includes: a unit configured to communicate a modulated signal via a signal interface; and at least one additional unit configured to receive the modulated signal from the unit. The at least one additional unit includes circuitry configured to remove jitter from a recovered clock signal to generate a jitter reduced clock signal that tracks long-term drift in the modulated signal, wherein the at least one additional unit is configured to generate the recovered clock signal from the modulated signal.

20 Claims, 7 Drawing Sheets

Related U.S. Application Data continuation of application No. 15/218,739, filed on Jul. 25, 2016, now Pat. No. 9,680,634, which is a continuation of application No. 14/739,465, filed on Jun. 15, 2015, now Pat. No. 9,509,487, which is a continuation of application No. 14/190,701, filed on Feb. 26, 2014, now Pat. No. 9,077,517, which is a continuation of application No. 13/076,002, filed on Mar. 30, 2011, now Pat. No. 8,681,917.

(60) Provisional application No. 61/319,623, filed on Mar. 31, 2010.

(51) Int. Cl.
  *H04L 7/033* (2006.01)
  *H04L 1/06* (2006.01)
  *H04W 88/08* (2009.01)

(52) U.S. Cl.
  CPC ............ *H04L 1/0631* (2013.01); *H04L 7/033* (2013.01); *H04W 88/085* (2013.01)

(58) Field of Classification Search
  USPC .......................................................... 375/371
  See application file for complete search history.

(56) References Cited

U.S. PATENT DOCUMENTS

| | | |
|---|---|---|
| 4,791,652 A | 12/1988 | McEachern et al. |
| 4,811,340 A | 3/1989 | McEachern et al. |
| 4,862,485 A | 8/1989 | Guinea et al. |
| 4,928,275 A | 5/1990 | Moore et al. |
| 5,052,025 A | 9/1991 | Duff et al. |
| 5,067,126 A | 11/1991 | Moore |
| 5,111,485 A | 5/1992 | Serack |
| 5,132,970 A | 7/1992 | Urbansky |
| 5,195,088 A | 3/1993 | Urbansky |
| 5,230,086 A | 7/1993 | Saul |
| 5,260,940 A | 11/1993 | Urbansky |
| 5,263,056 A | 11/1993 | Urbansky |
| 5,268,935 A | 12/1993 | Mediavilla et al. |
| 5,276,688 A | 1/1994 | Urbansky |
| 5,280,502 A | 1/1994 | Niegel et al. |
| 5,319,680 A * | 6/1994 | Port ..................... H03K 3/0315 331/2 |
| 5,327,430 A | 7/1994 | Urbansky |
| 5,331,671 A | 7/1994 | Urbansky |
| 5,337,315 A | 8/1994 | Ehrlich |
| 5,337,334 A | 8/1994 | Molloy |
| 5,343,476 A | 8/1994 | Urbansky |
| 5,359,605 A | 10/1994 | Urbansky et al. |
| 5,361,263 A | 11/1994 | Urbansky |
| 5,459,782 A | 10/1995 | Volejnik |
| 5,504,752 A | 4/1996 | Okazaki et al. |
| 5,534,822 A | 7/1996 | Taniguchi et al. |
| 5,539,785 A | 7/1996 | Burch et al. |
| 5,563,891 A | 10/1996 | Wang |
| 5,604,768 A | 2/1997 | Fulton |
| 5,619,506 A | 4/1997 | Burch et al. |
| 5,621,775 A | 4/1997 | Etienne |
| 5,642,357 A | 6/1997 | Suzuki et al. |
| 5,680,422 A | 10/1997 | Burch et al. |
| 5,983,070 A | 11/1999 | Georges et al. |
| 6,111,712 A * | 8/2000 | Vishakhadatta ..... G11B 19/247 360/51 |
| 6,157,810 A | 12/2000 | Georges et al. |
| 6,229,863 B1 | 5/2001 | Rude |
| 6,266,385 B1 | 7/2001 | Roy et al. |
| 6,415,006 B2 | 7/2002 | Rude |
| 6,441,658 B1 | 8/2002 | Taraci et al. |
| 6,501,942 B1 | 12/2002 | Weissman et al. |
| 6,542,754 B1 | 4/2003 | Sayers et al. |
| 6,704,545 B1 | 3/2004 | Wala |
| 6,891,417 B2 | 5/2005 | Khondker et al. |
| 7,031,344 B2 | 4/2006 | Rakib et al. |
| 7,039,357 B2 | 5/2006 | Weissman et al. |
| 7,042,259 B2 * | 5/2006 | Kurd ....................... H03L 7/093 327/147 |
| 7,576,576 B2 | 8/2009 | Drexler et al. |
| 7,664,214 B2 | 2/2010 | Knapp et al. |
| 8,205,338 B2 | 6/2012 | Xie |
| 8,681,917 B2 | 3/2014 | McAllister et al. |
| 9,077,517 B2 | 7/2015 | McAllister et al. |
| 9,509,487 B2 | 11/2016 | McAllister et al. |
| 9,680,634 B2 | 6/2017 | McAllister et al. |
| 10,027,469 B2 | 7/2018 | McAllister et al. |
| 2002/0041335 A1 * | 4/2002 | Taraci .................... G09G 5/006 348/511 |
| 2003/0091138 A1 | 5/2003 | Tagami |
| 2004/0004943 A1 * | 1/2004 | Kim .................... H04W 88/085 370/310 |
| 2004/0057542 A1 * | 3/2004 | Knapp ..................... H03L 7/06 375/355 |
| 2005/0001664 A1 * | 1/2005 | Khondker ................ H03L 7/07 327/165 |
| 2007/0103214 A1 * | 5/2007 | Drexler ................... H03L 7/07 327/156 |
| 2008/0137789 A1 | 6/2008 | Cranford et al. |
| 2008/0170469 A1 | 7/2008 | Phillips et al. |
| 2008/0212729 A1 | 9/2008 | Shaanan |
| 2011/0007664 A1 | 1/2011 | Diab et al. |

FOREIGN PATENT DOCUMENTS

| | | |
|---|---|---|
| CN | 101485110 A | 7/2009 |
| DE | 4339586 A1 | 5/1995 |
| EP | 0530775 A2 | 3/1993 |
| EP | 0585050 A2 | 3/1994 |
| EP | 0813322 A2 | 12/1997 |
| EP | 1827036 A1 | 8/2007 |
| EP | 2554015 B1 | 10/2018 |
| GB | 2331643 A | 5/1999 |
| JP | 4287481 B2 | 7/2009 |
| KR | 1020090113369 A | 10/2009 |
| WO | 9923759 A1 | 5/1999 |
| WO | 0027059 A1 | 5/2000 |
| WO | 0174100 A1 | 10/2001 |
| WO | 2008064027 A2 | 5/2008 |
| WO | 2009053910 A2 | 4/2009 |
| WO | 2011123635 A2 | 10/2011 |

OTHER PUBLICATIONS

"An Approach to Interoperable MTIE Compliance", Committee T1—Telecommunications, Sep. 3, 1998, pp. 1-2, San Antonio, Texas.

Calhoun et al., "Precision Time and Frequency Transfer Utilizing Sonet OC-3", Jet Propulsion Laboratory, pp. 339-348, Dec. 1996, California Institute of Technology.

European Patent Office, "Communication under Rule 71(3) from EP Application No. 11713439.5 dated Mar. 28, 2018", from Foreign Counterpart to U.S. Appl. No. 13/076,002, Mar. 28, 2018, pp. 1-47, Published: EP.

Grover et al., "Waiting Time Jitter Reduction by Synchronizer Stuff Threshold Modulation", IEEE Global Telecommunications Conference, Nov. 1987, pp. 13.71.1-13.7.5, IEEE.

International Searching Authority, "Communication Relating to the Results of the Partial International Search from PCT Application No. PCT/US2011/030712 dated Aug. 8, 2011", from Foreign Counterpart to U.S. Appl. No. 13/076,002, Aug. 8, 2011, pp. 1-5.

International Searching Authority, "Notification of Transmittal of the International Search Report and the Written Opinion of the International Searching Authority from PCT Application No. PCT/US2011/030712 dated Dec. 9, 2011", from Foreign Counterpart to U.S. Appl. No. 13/076,002, Dec. 9, 2011, pp. 1-15, Published: EP.

Klein, et al., "SONET/SDH Pointer Processor Implementations", 1994 IEEE Globecom, Dec. 1994, pp. 655-660, IEEE Communications Society and the San Francisco Section.

(56) References Cited

OTHER PUBLICATIONS

Korean Intellectual Property Office, "Notice of Allowance of Patent from KR Application No. 1020127026847 dated Jan. 10, 2018", from Foreign Counterpart to U.S. Appl. No. 13/076,002, Jan. 10, 2018, pp. 1-3, Published: KR.
Korean Intellectual Property Office, "Notice of Non-Final Rejection from KR Application No. 1020127026847 dated Apr. 3, 2017", from Foreign Counterpart to U.S. Appl. No. 13/076,002, Apr. 3, 2017, Published: KR.
Kusyk et al., "Analysis of Techniques for the Reduction of Jitter Caused by SONET Pointer Adjustments", IEEE Transactions on Communications, Apr. 1994, pp. 1-15, vol. 42, No. 2/3/4, IEEE.
Mulvey et al., "Jitter/wander analysis of adaptive clock recovery for constant bit rate services over ATM", BT Technollogy Journal, Jul. 1995, pp. 46-51, vol. 13, No. 3.
State Intellectual Property Office, P.R. China, "First Office Action from CN Application No. 201180016515.5 dated Dec. 31, 2014", from Foreign Counterpart to U.S. Appl. No. 13/076,002, Dec. 31, 2014, pp. 1-11, Published: CN.
State Intellectual Property Office, P.R. China, "First Office Action from CN Application No. 201610094478.4 dated Mar. 16, 2018", from Foreign Counterpart to U.S. Appl. No. 13/076,002, Mar. 16, 2018, pp. 1-9, Published: CN.
State Intellectual Property Office, P.R. China, "Notice to Grant from CN Application No. 201180016515.5 dated Dec. 4, 2015", from Foreign Counterpart to U.S. Appl. No. 13/076,002, Dec. 4, 2015, pp. 1-3, Published: CN.
State Intellectual Property Office, P.R. China, "Second Office Action from CN Application No. 201180016515.5 dated Aug. 28, 2015", from Foreign Counterpart to PCT Application No. U.S. Appl. No. 13/076,002, Aug. 28, 2015, pp. 1-4, Published: CN.
U.S. Patent and Trademark Office, "Supplemental Notice of Allowability", U.S. Appl. No. 14/190,701, dated Jun. 1, 2015, pp. 1-3, Published: US.
U.S. Patent and Trademark Office, "Final Office Action", U.S. Appl. No. 15/589,377, dated Dec. 11, 2017, pp. 1-59, Published: US.
U.S. Patent and Trademark Office, "Notice of Allowance", U.S. Appl. No. 13/076,002, dated Nov. 4, 2013, pp. 1-13, Published: US.
U.S. Patent and Trademark Office, "Notice of Allowance", U.S. Appl. No. 14/190,701, dated Feb. 17, 2015, pp. 1-10, Published: US.
U.S. Patent and Trademark Office, "Notice of Allowance", U.S. Appl. No. 14/739,465, dated Mar. 2, 2016, pp. 1-8, Published: US.
U.S. Patent and Trademark Office, "Notice of Allowance", U.S. Appl. No. 15/218,739, dated Dec. 30, 2016, pp. 1-18, Published: US.
U.S. Patent and Trademark Office, "Notice of Allowance", U.S. Appl. No. 15/589,377, dated Mar. 13, 2018, pp. 1-12, Published: US.
U.S. Patent and Trademark Office, "Office Action", U.S. Appl. No. 13/076,002, dated Jul. 22, 2013, pp. 1-31, Published: US.
U.S. Patent and Trademark Office, "Office Action", U.S. Appl. No. 14/190,701, dated Sep. 25, 2014, pp. 1-15, Published: US.
U.S. Patent and Trademark Office, "Office Action", U.S. Appl. No. 14/739,465, dated Oct. 27, 2015, pp. 1-12, Published: US.
U.S. Patent and Trademark Office, "Office Action", U.S. Appl. No. 15/218,739, dated Oct. 8, 2016, pp. 1-7, Published: US.
U.S. Patent and Trademark Office, "Office Action", U.S. Appl. No. 15/589,377, dated Jun. 22, 2017, pp. 1-29, Published: US.
U.S. Patent and Trademark Office, "Restriction Requirement ", U.S. Appl. No. 13/706,002, dated Jun. 10, 2013, pp. 1-6, Published: US.
U.S. Patent and Trademark Office, "Restriction Requirement", U.S. Appl. No. 14/190,701, dated Jul. 14, 2014, pp. 1-6, Published: US.
U.S. Patent and Trademark Office, "Supplemental Notice of Allowability" U.S. Appl. No. 15/589,377, dated Jun. 20, 2018, pp. 1-6, Published: US.
U.S. Patent and Trademark Office, "Supplemental Notice of Allowability", U.S. Appl. No. 15/218,739, dated May 10, 2017, pp. 1-6, Published: US.
Chang et al., "A 0.4-4-Gb/s CMOS Quad Transceiver Cell Using On-Chip Regulated Dual-Loop PLLs", IEEE Journal of Solid-State Circuits, May 2003, pp. 747-754, vol. 38, No. 5, IEEE, Exhibit WRST 11 to the Notice of Opposition from EP Application No. 1713439.5 dated Jul. 25, 2019.
European Patent Office, "Communication of a notice of opposition from EP Application No. 11713439.5 dated Jul. 25, 2019", from Foreign Counterpart to U.S. Appl. No. 13/076,002, pp. 1-49, Published: EP.
Wikipedia, "Phase-locked loop", last updated on Jul. 4, 2019, pp. 1-15, Wikipedia, Exhibit WRST 3 to the Notice of Opposition from EP Application No. 1713439.5 dated Jul. 25, 2019.
Exhibit WRST 2 to the Notice of Opposition from EP Application No. 1713439.5 dated Jul. 25, 2019, Claims of the Opposed Patent, structured according to features, pp. 1-2.

\* cited by examiner

SYNCHRONOUS TRANSFER OF STREAMING DATA IN A DISTRIBUTED ANTENNA SYSTEM

CROSS-REFERENCE TO RELATED APPLICATIONS

This application is a continuation application of U.S. Non-Provisional patent application Ser. No. 15/589,377, filed May 8, 2017 and entitled "SYNCHRONOUS TRANSFER OF STREAMING DATA IN A DISTRIBUTED ANTENNA SYSTEM", which application is a continuation application of U.S. Non-Provisional patent application Ser. No. 15/218,739, filed Jul. 25, 2016 and entitled "SYNCHRONOUS TRANSFER OF STREAMING DATA IN A DISTRIBUTED ANTENNA SYSTEM", which application is a continuation application of U.S. Non-Provisional patent application Ser. No. 14/739,465, filed Jun. 15, 2015 and entitled "SYNCHRONOUS TRANSFER OF STREAMING DATA IN A DISTRIBUTED ANTENNA SYSTEM" (issued as U.S. Pat. No. 9,509,487 on Nov. 29, 2016), which application is a continuation application of U.S. Non-Provisional patent application Ser. No. 14/190,701, filed Feb. 26, 2014 and entitled "SYNCHRONOUS TRANSFER OF STREAMING DATA IN A DISTRIBUTED ANTENNA SYSTEM" (issued as U.S. Pat. No. 9,077,517 on Jul. 7, 2015), which application is a continuation application of U.S. Non-Provisional patent application Ser. No. 13/076,002, filed Mar. 30, 2011 and entitled "SYNCHRONOUS TRANSFER OF STREAMING DATA IN A DISTRIBUTED ANTENNA SYSTEM" (issued as U.S. Pat. No. 8,681,917 on Mar. 25, 2014), which application claims the benefit of U.S. Provisional Patent Application Ser. No. 61/319,623, filed Mar. 31, 2010 and entitled "SYNCHRONOUS TRANSFER OF STREAMING DATA VIA ETHERNET PHYS AND MECHANISMS OF CLOCK RECOVERY AND SYNCHRONIZATION", which applications and patents are incorporated herein by reference in their entireties.

FIELD OF THE INVENTION

The present invention is directed to wireless communication systems, and specifically is directed to the synchronous transfer of streaming data in a distributed antenna system.

BACKGROUND OF THE INVENTION

Conventional communication systems, such as cellular phone systems and broadband wireless metropolitan networks, are often divided into a number of cells. These cells are typically distributed in a pattern to preclude co-channel interference and thus provide coverage of subscriber units operating within the service area of the system. In some systems, each cell includes a base station that employs radio frequency (RF) transceiver equipment, antennas, and wireline communication equipment. The subscriber units in the area of a cell site thus use RF transceivers to communicate with the RF transceivers of the base station. In turn, the base station relays voice and data traffic to/from the mobile units and to/from a mobile telephone switching office or access service gateway. This office or gateway is, in turn, generally connected to a central network, such as a public switched telephone network.

To improve system capacity, some cells are further divided into sectors or smaller cells, with the base station replaced by lower cost but reduced capability micro or pico cells. In addition, distributed antenna systems are often employed to optimize the RF distribution in larger cells to increase coverage at a lower cost than multiple pico or micro cells. These approaches permit the reuse of a limited number of RF channels without the costs of installing new base stations. Also, such techniques can be used to extend coverage to areas where RF propagation is limited by obstructions, such as buildings and tunnels, and to areas where the amount of traffic and revenue do not justify the investment for another base station. The distributed antenna systems (DAS) themselves often include a master unit connected to various base transceiver stations of various cellular providers employing different air interfaces. The master unit, in turn, is connected to a series of physically separate remote antenna units. The remote units are connected to the master unit using a high speed serial link (HSSL), and the master unit downconverts and digitizes signals from the base station and time division multiplexes the digital data that is transmitted over serial links to the remote units. The remote units convert the signals back to analog, upconvert, and transmit to subscribers. Similarly, the remote units downconvert and digitize uplink signals from the subscribers and transmit the signals back to the master unit, which converts them to the proper format to transmit to the base stations.

Air interface standards for the distributed antenna system levy requirements on the frequency shift that can be imposed on the signals of the system. Some standards, such as Global System for Mobile Communications (GSM) impose such strict standards that they can only be met by frequency locking all signals used for frequency translation within the distributed antenna system to a single common standard. This ensures that all frequency errors introduced by the up and down conversion processes cancel. Consequently, local oscillator signals used for up and down conversion and the clocks used for digital to analog and analog to digital conversion processes must be frequency locked to a common reference. Use of disciplined oscillators, where the oscillators are disciplined by other communication systems, such as GPS or WWV, in all components of the distributed antenna system could be employed to effect the frequency locking. However, this would significantly increase the cost of the distributed antenna system and in many applications where a distributed antenna system would be employed, such as in buildings or tunnels, reception of such signals is problematic at best and nonexistent at worst. The master unit reference could be cabled to remote units with additional cables or additional wires within the serial link cables being used to transfer data. But adding extra cables multiplies the cost of deployment and in some cases may not be physically possible. Moreover, adding additional wires to cables is not always possible as is the case in applications using existing CAT 5/6/6A cable in buildings or other structures, where all cable pairs are required for high speed data transfer and/or are already otherwise used.

To minimize the cost of installation and to take advantage of existing cabling infrastructure, it is also desirable, whenever possible, to use low cost communication cables employing a plurality of conductors, such as unshielded twisted pair cable instead of more expensive shielded twisted pair or fiber optic cables. Use of twisted pair also permits the use of relatively inexpensive copper PHYs such as 10GBase-T Ethernet, instead of the more expensive optical transceivers such as SFP and XFP modules. Use of unshielded twisted pair cables, however, results in additional susceptibility to interfering signals. High data rate serial protocols, such as 10GBase-T Ethernet, which are required to handle the high data rates necessary to transport wideband digitized RF, are particularly susceptible to alien crosstalk because of the more complex modulation schemes and wide bandwidths employed by such formats. Increased crosstalk and noise will lead to more jitter on the data and, hence, more jitter on the recovered clock as well. This jitter must be removed to avoid contaminating the analog to digital and digital to analog conversion processes in order to exploit the cost and installation advantages of unshielded twisted pair.

With respect to other communication links, signals on fiber optic cables are generally not as susceptible to crosstalk from other cables, and crosstalk is not nearly as severe in shielded cables. But such fiber optic cables and shielded cables, as well as the equipment used therewith, is often cost prohibitive and also cannot be used in those applications attempting to reuse cable already in buildings. For example, it may be necessary to take advantages of existing infrastructure, to accommodate mixed systems that use both fiber-optics (such as between floors) and twisted pairs (such as in horizontal runs on a floor).

Therefore, there is a need in the art for a system that can effectively reuse existing communication system infrastructures, such as for distributed antenna systems, without introducing additional costs associated therewith. There is further a need to address jitter, cross-talk, and noise issues in a DAS with twisted pair infrastructure to ensure the system master clock can be transferred to all remote elements to preclude a shift in RF from being introduced during up and down conversions. Still further, there is a need to have a DAS that can handle not only cellular communications but also other communications, such as public safety and radio and WiFi in a single cost-effective system.

SUMMARY

Embodiments of the invention provide a method, distributed antenna system, and components thereof that generate a jitter reduced clock signal from a serial encoded binary data stream transmitted over a communication medium. The method comprises receiving a modulated signal that includes the encoded binary data stream via high speed data interface circuitry and extracting the encoded binary data stream from the modulated signal. The method further comprises generating a recovered clock signal that is phase locked to the encoded binary data stream with a phase-locked loop. The method still further comprises generating an error signal based on a difference between a phase of the encoded binary data stream and the recovered clock signal and integrating the error signal with a loop filter configured with a bandwidth that allows the jitter and drift in the encoded binary data stream to generate a signal to control a voltage controlled oscillator. The method further comprises generating a stable recovered clock signal by filtering the recovered clock signal to remove jitter without substantially affecting the frequency of the stable recovered clock signal to allow the stable recovered clock signal to track drift of the encoded binary data stream, and producing at least one output clock by scaling the stable recovered clock signal frequency.

In alternative embodiments, a remote unit for a distributed antenna system is provided. The remote unit includes high speed data interface circuitry for communicating with a master unit, RF transceiver circuitry for communicating with a subscriber unit, and a processing unit that multiplexes and routes data to the high speed data interface and that de-multiplexes and routes data from the high speed data interface circuitry to the RF transceiver circuitry. The remote unit further includes a clock recovery circuit that includes a phase-locked loop, the phase-locked loop including a loop filter having a bandwidth that does not substantially block the jitter or long-term drift in a modulated signal, the clock recovery circuit configured to receive the modulated signal from the high speed data interface circuitry that includes a serial encoded binary data stream and further configured to generate a recovered clock signal therefrom, as well as a filtering circuit configured to filter the recovered clock signal to remove jitter and generate a stable recovered clock signal. The remote unit still further includes a scaling circuit configured to scale the frequency of the stable recovered clock signal to generate at least one output signal at a respective predetermined target frequency.

Still further embodiments of the invention include a distributed antenna system that includes a master unit and at least one remote unit. The master unit clocks an encoded data stream onto high speed data interface circuitry via a modulated signal based upon an output of a reference oscillator. The remote unit includes high speed data interface circuitry for receiving the modulated signal from the master unit and a clock recovery circuit. The clock recovery circuit, in turn, includes a phase-locked loop, the phase-locked loop in turn including a loop filter configured with a bandwidth that does not substantially block the jitter or long-term drift in the modulated signal. As such, the clock recovery circuit is configured to generate a recovered clock signal from the modulated signal that includes the encoded data stream. Still further, the remote unit includes a filtering circuit configured to filter the recovered clock signal to remove jitter and further configured to generate a stable recovered clock signal and a scaling circuit configured to scale the frequency of the stabled recovered clock signal to generate an output signal at a predetermined target frequency.

Additional embodiments of the invention include a method of generating a jitter reduced clock signal from an encoded data stream. The method comprises generating a recovered clock signal based on the encoded data stream, the recovered clock signal being phase locked to an oscillator used to clock the encoded data stream onto a modulated signal. The method further comprises clocking data from the encoded data stream into a processing unit based on the recovered clock signal and detecting a periodic signal component, other than the bit rate, of the encoded data stream with the processing unit. Still further, the method comprises generating a reference clock signal based on the detected periodic signal component, filtering the reference clock signal with a circuit having a bandwidth that substantially blocks jitter while substantially allowing long term drift of the reference clock signal, and scaling a frequency of the reference clock signal to generate at least one output signal at a predetermined target frequency.

Further alternative embodiments include a master unit for a distributed antenna system. The master unit includes high speed data interface circuitry for exchange of data with at least one remote unit and first RF transceiver circuitry for communicating with at least one base transceiver system. The master unit further comprises a processing unit that multiplexes data from the at least one secondary interface, the first RF transceiver, and the second RF transceiver and routes the multiplexed data to a PHY for transmission via the high speed data interface circuitry, and that de-multiplexes data from the high speed data interface circuitry and routes the de-multiplexed data to at least one of the at least one secondary interface, the first RF transceiver, or the second RF transceiver. Still further, the master unit comprises a reference oscillator that is used to multiplex and/or de-multiplex the data to and/or from the high speed data interface.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of embodiments of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding. In particular, thin features may be thickened, for example, for clarity or illustration.

DETAILED DESCRIPTION OF THE INVENTION

Embodiments of the present invention provide a remote unit that can be used to recover a clock signal embedded in a modulated signal. To do this, embodiments of the invention are capable of extracting the clock signal from the modulated signal, reducing the jitter on that extracted signal, then scaling the frequency of that signal. Advantageously, this allows a master unit to communicate with remote units over an unshielded twisted pair cable such that the cost for deployment is lessened. Embodiments of the invention further account for distributed antenna systems that use a mixed combination of fiber optic and twisted pair cables and also can be used to recover a clock signal embedded as a component of the modulated signal.

Figure 1:
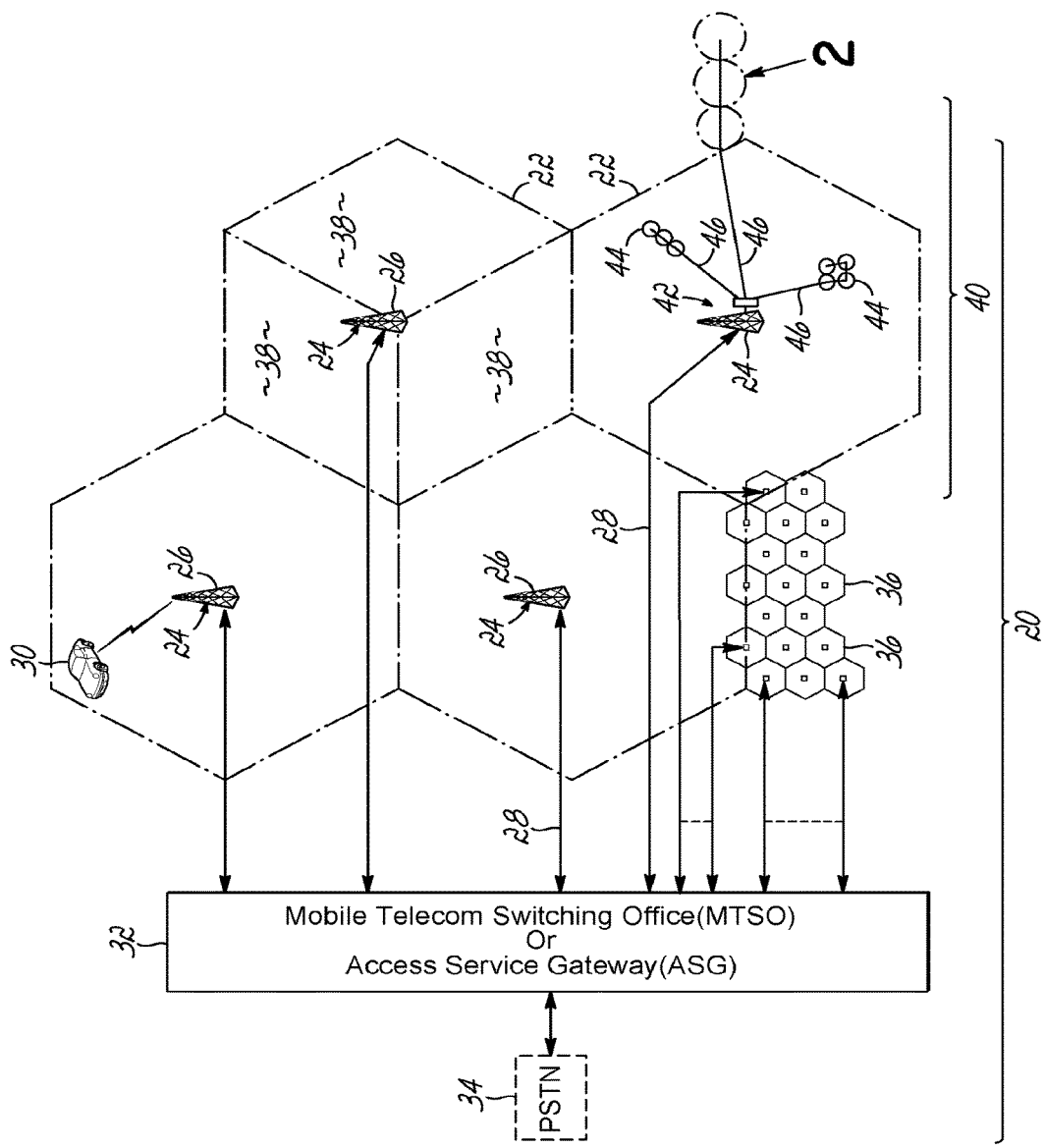
FIG. 1 is a block diagram of a cellular phone system and broadband wireless metropolitan network consistent with embodiments of the invention.
Figure 2:
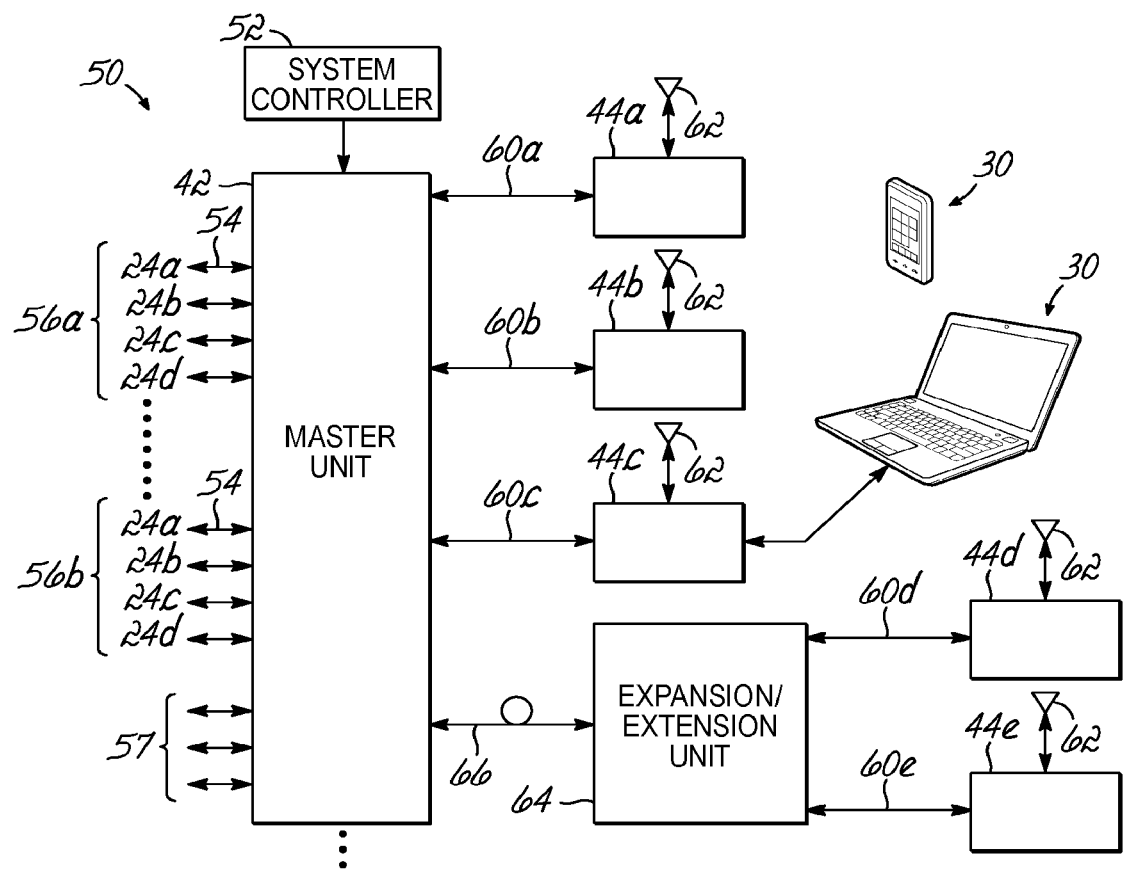
FIG. 2 is a block diagram of a distributed antenna system included in the system and network of FIG. 1.

Cellular phone systems and broadband wireless metropolitan networks 20, as shown in FIGS. 1 and 2, are generally divided into a number of cells 22 distributed in a pattern to preclude co-channel interferences and provide coverage of mobile and fixed subscriber units operating within the service area of the system. Each cell 22 includes a base station 24 that employs radio frequency (RF) transceiver equipment, antennas 26, and wireline 28 communication equipment. Mobile/fixed subscriber units 30 within the geographic area of the cell site use RF transceiver equipment to communicate with RF transceivers within the base station 24. The base station 24 relays voice and data traffic to/from the subscriber mobile units or devices (e.g. a phone) 30 and to/from a Mobile Telephone Switching Office 32 or Access Service Gateway which in turn are connected to a central network such as the public switched telephone network (PSTN) 34 or packet switched networks such as the Internet, for example.

To improve the capacity of a base station 24 to handle more mobile users 30, cells 22 may be divided into sectors 38 or are further subdivided into smaller cells with the base station 24 being replaced with lower cost, reduced capability micro or pico cells 36. In some configurations, distributed antenna systems (DAS) may be employed to optimize the RF distribution in larger cells in order to increase capacity at an even lower cost than with pico and/or micro cells 36. These approaches permit the reuse of a limited number of expensive RF channels without incurring the costs of one or more complete base stations 24. Further, these techniques may also be used to extend coverage to areas within the cell site where RF propagation may be limited by obstruction, such as in buildings and tunnels, or to areas where the amount of traffic (revenue) does not justify the investment required for a complete base station 24. Distributed antenna systems allow the RF coverage to be adapted to the specific environment in a homogeneous way to assist in reducing the amount of introduced interference. In addition, the amount of extra traffic is kept low as only existing cells are distributed and no hand-off between cells is required.

In order to reduce the costs associated with the development of their communication systems, multiple service providers often locate their base stations 24 at the same geographical point. The providers can then share such items as antennas, antenna towers, primary power drops, land costs, and regulatory costs. These service providers may employ multiple RF bands, multiple channels within the same RF band and multiple air interface standards (e.g. GSM, LTE, CDMA, UMTS, TDMA, and WiMax).

The system 20 may also include a distributed antenna system 40 that, in turn, includes a master unit 42 collocated with at least one base station 24. The master unit 42 may be connected to the base station 24, which is then connected to the Mobile Telephone Switching Office 32 via a wireline 28 connection. A group of remote antenna units 44 are interconnected via high speed digital transport links 46. The transport of RF signals in a digital format may assist in preventing any appreciable degradation due to the transport link. Spectral filtering may also be used to allow or prevent the distribution of specific radio signals. Additionally, the individual group delay of spectral components may be individually adjusted without hardware modifications. Thus, quality degrading delay differences between overlapping simulcast cells may be avoided.

The digital transport mechanism employed in embodiments of the invention allows for flexible use of the available bandwidth over the high speed data interfaces. The dominant use of these links is generally for RF spectrum. A time division multiplexed format of the links permits transport of multiple signals, which may even be at the same RF frequency. Further, data from data communication links such as Ethernet may also be inserted in the digital transport links for system monitoring, configuration, control, as well as other user applications, such as public safety communications and WiFi hot spots. When the communication medium employed on the high speed data links does not support the full rate transfer, the master unit or remote units dynamically scale the amount of RF bandwidth transmitted over the high speed serial data interfaces or eliminate low priority data. In particular, a processing unit of a master unit 42 or remote unit 44 may determine that the communication medium is unable to transfer data at a particular rate, speed, such as 10 Gbps. As such, the processing unit of the master unit 42 or remote unit 44 may dynamically shed RF bandwidth of the signal transmitted between the master unit 42 and remote unit 44, or the processing unit of the master unit 42 or remote unit 44 may not transmit lower priority data, such as Ethernet data or WiFi data, transmitted between the master unit 42 and remote unit 44.

In one embodiment, the distributed antenna system 50, as illustrated in FIG. 2, includes one or more master units 42 and a system controller 52 configured to control each master unit 42 collocated with a base station 24a-d. In one embodiment, each master unit 42 is capable of handling up to six RF bands with up to four service providers per band for Frequency Division Duplexed (FDD) air interfaces and one operator per band for Time Division Duplexed (TDD) air interfaces, although one of ordinary skill in the art will appreciate that other master units 42 may be capable of handling more or fewer RF bands, service providers or operators. The master unit 42 is connected to a base station 24a-d via coupling interfaces 54. The master unit 42 is also connected to a series of distributed antenna units 44, hereinafter referred to as remote units, or remote antenna units via high speed data interfaces. In the illustrated embodiment of FIG. 2, four such interfaces are shown, although one of ordinary skill in the art will appreciate that other master units may have more than four interfaces. In specific embodiments, the master unit 42 is connected directly to each remote unit 44 via a respective high speed communication medium 60 employing low cost communication cable having at least three conductors, such as unshielded twisted pair. Each remote unit 44 may be configured to handle up to six RF bands, for example.

For each RF band 56a, 56b, the master unit 42 combines the downlink signal from the base stations 24a-d on a per band basis and digitizes the combined signal into a binary encoded data stream. One of ordinary skill in the art will recognize there may be more or fewer base stations 24 communicating with the master unit 42. The binary encoded data streams from each of the RF bands 56a, 56b may then be time division multiplexed and converted to a single serial stream. The serial data is transmitted to the remote units 44a-c via respective communication medium 60, such as twisted pair cables 60a-c. The remote units 44a-c receive that modulated signal, extract the data stream from the modulated signal, then extract a clock signal from that data stream, de-multiplex them and retransmit each band at an RF frequency, via a local antenna 62, to subscriber units 30. In alternative embodiments, the master unit 42 may digitize the downlink signal from the base stations 24a-d on a per band basis, then multiplex the digitized signal into the binary encoded data stream.

The distributed antenna system 50 may include more or fewer components, including more or fewer master units 42, remote units 44, and/or extension units 64 than illustrated in FIG. 2. In turn, each master unit 42, remote unit 44, and/or extension unit 64 may include more or fewer components. Specifically, the master unit 42 may include more or fewer input interfaces, each of which may be wireless or wireline RF interfaces. For example, the master unit 42 may receive various cellular base transceiver system signals (GSM, LTE, CDMA, UMTS, etc.), such as via the signals from the base stations 24a-24d, and may implement connections 57 for other RF services (e.g., from public safety entities), WiFi data, Ethernet data, or data from a maintenance terminal. Moreover, the master unit 42 may be connected to a plurality of remote units 44 connected serially through one or two dedicated communication interfaces or one dedicated interface. In turn, the distributed antenna system 50 may include remote units 44 that utilize more than six RF bands and/or that include additional interfaces. Moreover, the Digitally Modulated Optical Cables (DMOC) 66 including the optical transceiver may also be replaced by a different transceiver for high data rate media such as coax cable, twisted pair copper wires, free space RF or optics, or shared networks such as Ethernet, SONET, SDH, ATM, PDH, among others.

In some embodiments, the master unit 42 may include one or more optical links that are connected to an expansion and/or extension unit 64 via the DMOC 66. The extension unit 64 provides additional communication mediums for distribution of voice and data traffic, command and control, and user data for to up to sixteen remote units 44, thereby increasing the number of remote units 44 a single master unit 42 can handle. The extension unit 64 may communicate with master units 42 using the same wavelength in both directions. The remote units 44d-e also receive RF voice and/or data signals, designated as the uplink signal, from the customer or subscriber units/devices 30 via the local antennas 62.

With respect to the remote units 44, each RF uplink band is digitized separately. The uplink signals for each band are combined into a single serial digital protocol and transmitted via the respective communication medium 60a-e to the respective master unit 42 or to the master unit 42 through the extension unit 64. The master unit 42 separates the signals from each band, converts them to analog signals, converts or translates each to the appropriate radio frequency, and sends them to the appropriate base station 24.

In addition to the digitized signal from each RF band, the uplink communication mediums 60a-c and 66 also contain Operation and Maintenance (O&M) data, Ethernet data, User Ethernet (10 Mb/s, 100 Mb/s, 1 Gb/s, or higher data rate signals), and WiFi data. The former signal is used to configure and control the system and monitor system status. The User Ethernet signals may be used by the service providers as they see fit. The system controller 52 provides overall supervision and control of the master unit 42 and the remote units 44 as well as alarm forwarding.

Figure 3:
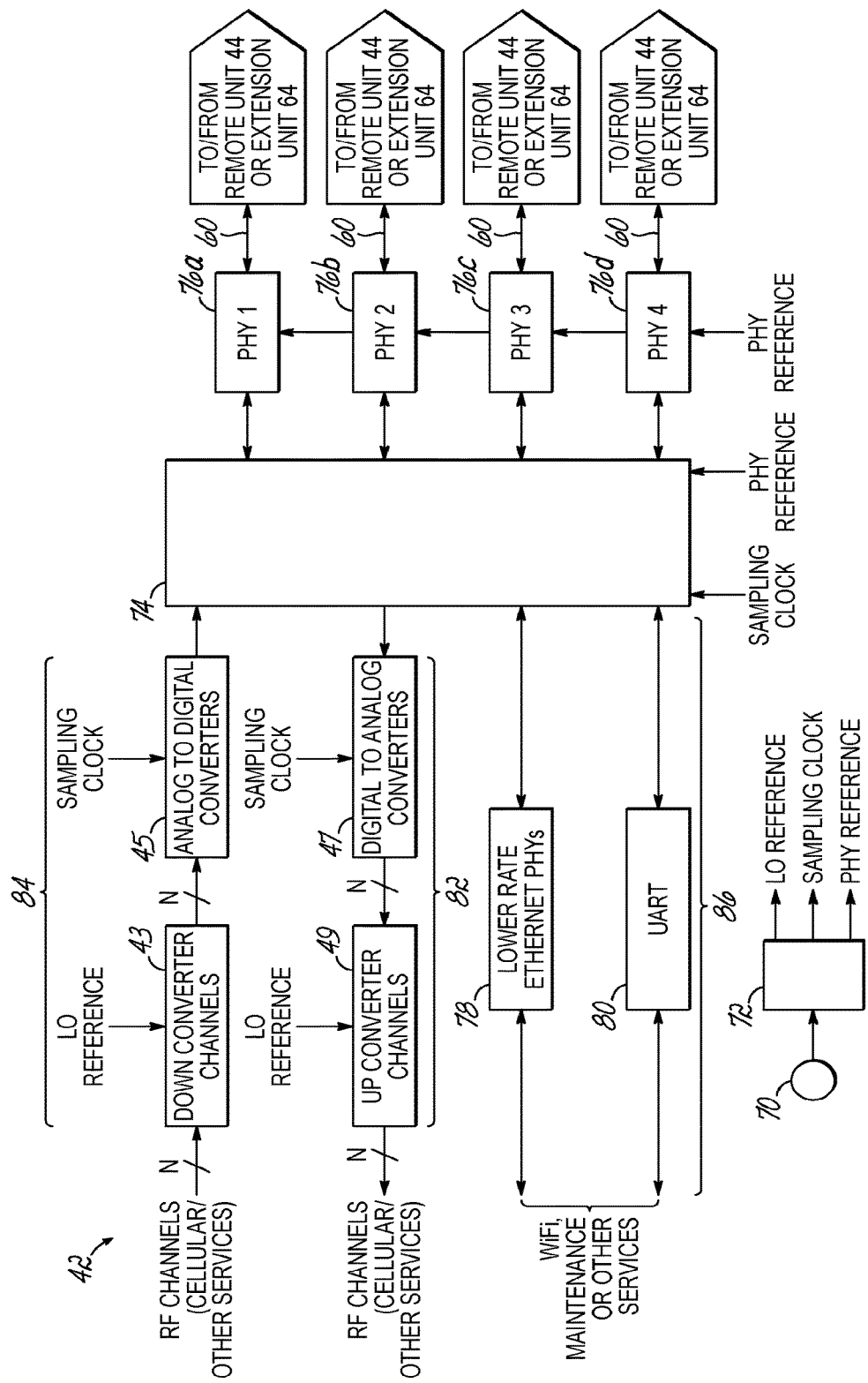
FIG. 3 is a block diagram of a master unit of the distributed antenna system of FIG. 2.

Focusing now on the master unit 42, FIG. 3 contains a detailed block diagram of an example of the master unit 42. The master unit 42 receives RF signals from a variety of base transceiver stations (BTS) and other services, then downconverts and digitizes those signals using appropriate RF transceiver circuitry 84 that may include frequency down converter circuits 43 and analog to digital (ND) converters 45. The master unit 42 includes a stable reference oscillator 70 that feeds phase/frequency locked loops/frequency divider circuitry 72 to generate one or more LO references, sampling clocks, and PHY references. A processing unit 74, such as an FPGA, or other suitable processor produces a serial stream and routes that data to a high-rate Ethernet physical layer device (PHY) 76, using the PHY reference, which is synchronized to the reference oscillator 70. Each PHY 76a-d encodes the data into an encoded data stream to eliminate long strings of ones and zeros, then clocks the data on the respective communication mediums (e.g., unshielded twisted pair cable) as a modulated signal using the PHY reference that is based upon reference oscillator 70. By using the PHY reference, which is phase locked to the reference oscillator 70, any long-term drift in the frequency of the oscillator 70 is transferred to the bit rate of the encoded data stream transmitted over the interfaces as a modulated signal.

In the reverse, data received from a remote unit 44 or extension unit 64 is decoded, error corrected by the respective PHY 76a-d, then routed to the processing unit 74. The processing unit 74 de-multiplexes the data and routes the digital signals through appropriate RF transceiver circuitry 82, which may include a digital to analog (D/A) converter 47 and a frequency upconverter 49. The D/A converter 47 is for conversion of the digitized baseband data to analog signals. The analog signals are then up-converted to appropriate frequencies using appropriate frequency upconverters 49. Data for WiFi and other non-RF services are routed to slower high speed data interface circuitry 86, which in turn includes Ethernet PHYs 78, UARTs 80, or other similar devices for distribution. In the master unit 42, the down-conversion or up-conversion of signals is done with the LO reference tied to the oscillator 70. In turn, the conversion of a down-converted signal to digital data, and the conversion of digital data to an analog signal, is performed with the sampling clock tied to the oscillator 70. In this manner, all signals in to the master unit 42 and all signals from the master unit 42 are tied to the oscillator 70 consistent with embodiments of the invention.

Although PHYs 76a-d are illustrated as being used to send data to the remote units 44 and/or extension unit 64, the data is sent in a synchronous manner without typical inter-packet gaps to maximize throughput. Specifically, utilizing PHYs 76 allows high data rates of at least 10 Gbps over inexpensive unshielded twisted pair cable when the length of the run from the master unit 42 to the remote unit is sufficiently short. This may significantly reduce the cost of a distributed antenna system 40 for some application, and in particular those in buildings.

Moreover, although a PHY 76 is shown and disclosed as being connected to a remote unit 44 or extension unit 64 through a communication medium 60 to transmit data to and/or from the remote unit 44 or extension unit 64, additional RF transceiver circuitry may be included in the master unit 42 at the high speed data interface circuitry, or the RF circuitry 82, 84, to communicate non-cellular radio frequency voice or data with a subscriber unit 30 through a master unit antenna (not shown).

Figure 4:
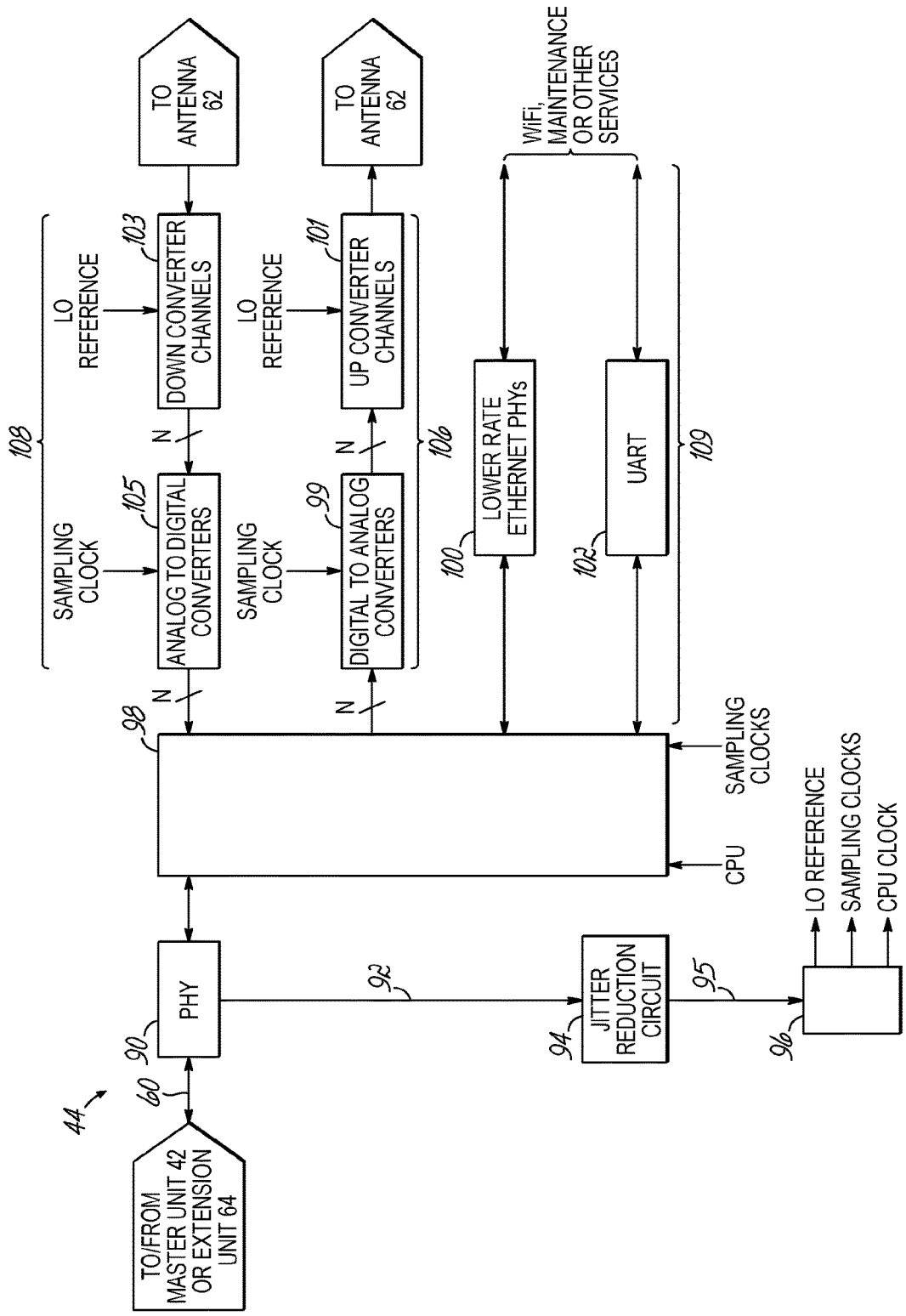
FIG. 4 is a block diagram of a remote unit of the distributed antenna system of FIG. 2.

Focusing now on a remote unit 44, FIG. 4 contains a detailed block diagram of a remote unit 44. Each remote unit 44 includes a high speed data interface, such as a PHY 90, that receives an encoded serial digital signal with a bit rate modulated by the drift in the reference oscillator 70, hereinafter referred to as a modulated signal, from the master unit 42 or an extension unit 64 and extracts the encoded data stream therefrom. The PHY 90, in turn, produces a recovered clock signal as at 92 that is phase locked to the encoded data stream, and thus to the oscillator 70 of the master unit 42. In accordance with one aspect of the invention, the recovered clock signal 92 is filtered by a jitter reduction circuit 94, which may include a narrowband phase-locked loop or a crystal filter. The jitter reduction circuit 94 produces a stable recovered clock signal 95 that is further phase locked and/or frequency divided by a phase/divider circuit 96. The phase/divider circuit 96, in turn, produces an LO reference, a sampling clock, and a processing unit clock signal (illustrated as "CPU CLOCK"). The data output of the PHY 90 (e.g., the encoded data stream) is routed to a processing unit 98, which may be an FPGA or other suitable processor, that demultiplexes the data stream. In turn, the processing unit 98 routes that demultiplexed data to appropriate RF transceiver circuitry 106, that may include a digital to analog (D/A) converters 99 and upconverter circuits 101. The D/A converters 99 are for conversion into analog signals, while the upconverter circuits 101 frequency upconvert the analog signals into appropriate RF frequencies and transmit the upconverted signal to subscriber units 30 via one or more suitable antennas, such as local antenna 62. The present invention is not limited to specific RF transceiver circuitry used to communicate with particular subscriber units 30. For example, the remote unit 44 may include additional RF transceiver circuitry for communicating non-cellular RF voice and/or data with a subscriber unit 30. Non-baseband data is routed to high speed data interface circuitry 109, which in turn includes lower speed Ethernet PHYs 100 or UARTs 102.

RF signals received from subscriber units 30 via antenna 62 are received by RF transceiver circuitry 108, which includes a downconverter circuits 103 and ND converters 105. The downconverter circuits 103 downconvert the received RF signal, which are each digitized by ND converters 105 and routed to the processing unit 98. The processing unit 98 time-division multiplexes the data into a serial stream along with lower rate Ethernet data and/or other serial data from the Ethernet PHYs 100 and/or UART 102. This data is routed to the PHY 44 where it is coded and sent to the master unit 42 or extension unit 64.

The PHY 90 in the remote unit 44 phase and/or frequency locks at least one voltage-controlled oscillator (VCO) (not shown in FIG. 4) of a phase-locked loop (PLL) to the incoming data from the master unit 42 or extension unit 64. In turn, the output of a voltage-controlled oscillator (VCO) is used to recover the data and decode it. The bandwidth of the frequency locked loop is configured to be wide enough to track the long-term drift in the rate of the data due to variation in the frequency of the oscillator 70 of the master unit 42 as well as any wide band jitter introduced by or in the high speed serial link communication couplings between the remote unit 44 and the master unit 42. This, in effect, transfers any drift in the frequency of the oscillator 70 of the master unit 42 to the remote unit 44.

As illustrated in FIG. 4, each remote unit 44 reduces the jitter in a recovered clock signal 92 with a jitter reduction circuit 94 that is configured to lock a second voltage-controlled oscillator (not shown in FIG. 4) to the oscillator 70 of the master unit 42. The jitter reduction circuit 94, however, may have much lower phase noise than the oscillator of the PHY 90. In particular, the jitter reduction circuit 94 may use a narrowband PLL for locking phase and frequency as noted. The bandwidth of this narrowband PLL is configured to track the long-term drift of the oscillator 70 of the master unit 42 and reject short-term jitter contributed by the PHY 90 oscillator and impairments in the communication couplings between the remote unit 44 and the master unit 42 (e.g., including through an extension unit 64, if necessary). The narrowband PLL, however, may be replaced with a narrowband crystal filter in applications where interference in the serial communication couplings between the remote unit 44 and the master unit 42 are less severe. The output 95 of the jitter reduction circuit 94, in turn, may be used to derive the LO reference, sampling clocks, and CPU CLK signals, each of which are frequency and/or phase locked by the phase/divider circuit 96. This ensures that all references and/or clock signals in the remote unit 44 and the master unit 42 that are used for frequency translation are phase and/or frequency locked to the oscillator 70 in the master unit 42. Thus, the distributed antenna system 40 does not shift the signals being broadcast, distributed, and/or repeated.

Figure 5:
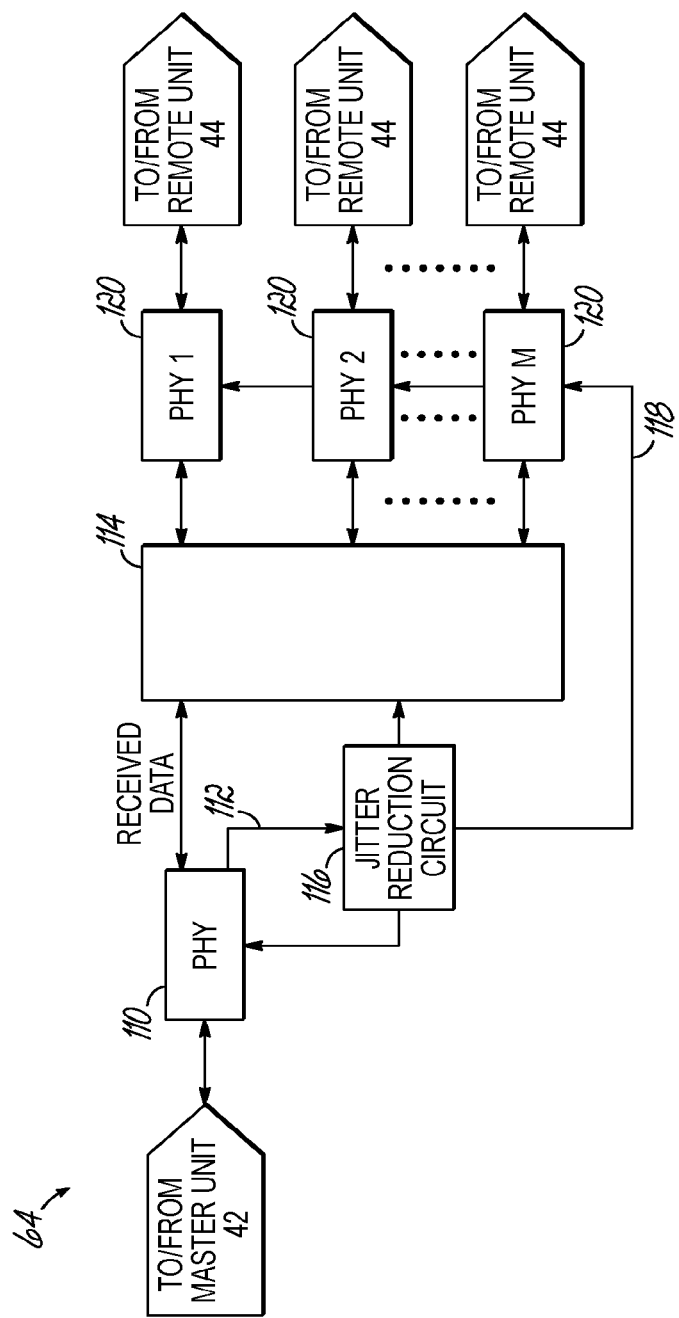
FIG. 5 is a block diagram of an extension unit of the distributed antenna system of FIG. 2.

A detailed block diagram of an extension unit 64 is illustrated in FIG. 5. The extension unit 64 routes data from a master unit 42 to each remote unit 44 connected thereto. It also combines the data from the remote units 44 connected thereto into a single serial stream and routes that data via a PHY 110 to the master unit 42. The extension unit 64 also transfers the drift of the oscillator 70 in the master unit 42 to the remote units 44 to ensure that the references and/or clock signals for the remote units 44 are phase and/or frequency locked to that oscillator 70. As such, the extension unit 64 includes a PHY 110 that receives the modulated signal from the master unit 42 and extracts the encoded data stream therefrom. The PHY 110, in turn, produces a recovered clock signal as at 112 that is phase locked to the encoded data stream, and thus to the oscillator 70 of the master unit 42. The PHY 110 passes the encoded data stream to a processing unit 114, which may be an FPGA. The recovered clock signal 112 is also filtered by a jitter reduction circuit 116, which may include a narrowband PLL or a crystal filter, and outputs a recovered clock signal that is utilized as a PHY reference signal as at 118. The processing unit 114 sends data for the remote units 44 to the remote units 44 via a separate set of PHYs 120. Each PHY 120 sends the data with reference to the PHY reference.

The extension unit 64 may be coupled to the master unit 42 through unshielded twisted pair cable for applications where the number of remote units 44 necessary for the distributed antenna system 40 exceeds the capability of the master unit 42, or fiber where the distance between the extension unit 64 and the master unit 42 exceeds the length limitations of the PHY 110. Similar to the PHY 90 of the remote units 44, the PHY 110 phase and/or frequency locks the recovered clock signal 112 to the incoming data. The recovered clock signal 112 is used to recover and decode the data. Also, similar to the jitter reduction circuit 94 of the remote units 44, the bandwidth of the jitter reduction circuit 116 is again configured to be wide enough to track the long-term drift in the rate of data due to a variation in the oscillator 70 of the master unit 42 as well as any wide band jitter introduced by or in the communication couplings between the extension unit 64 and the master unit 42. This, in effect, transfers any drift in the oscillator 70 of the master unit 42 to the extension unit 64. The extension unit 64 reduces the jitter in the recovered clock signal 112 using a narrowband PLL or crystal filter similar to that described above. One of the clock outputs of the jitter reduction circuit 116 may be the PHY reference 118 for the PHYs 120 that send and receive data from the remote units 44. Since this PHY reference 118 is tracking the long-term drift of the oscillator 70, the drift is imparted to the rate of the data sent to the remote units 44. Advantageously, this may preclude the accumulation of jitter that may occur if the recovered clock signal 112 were used as the PHY reference 118 without first performing jitter reduction.

Figure 6:
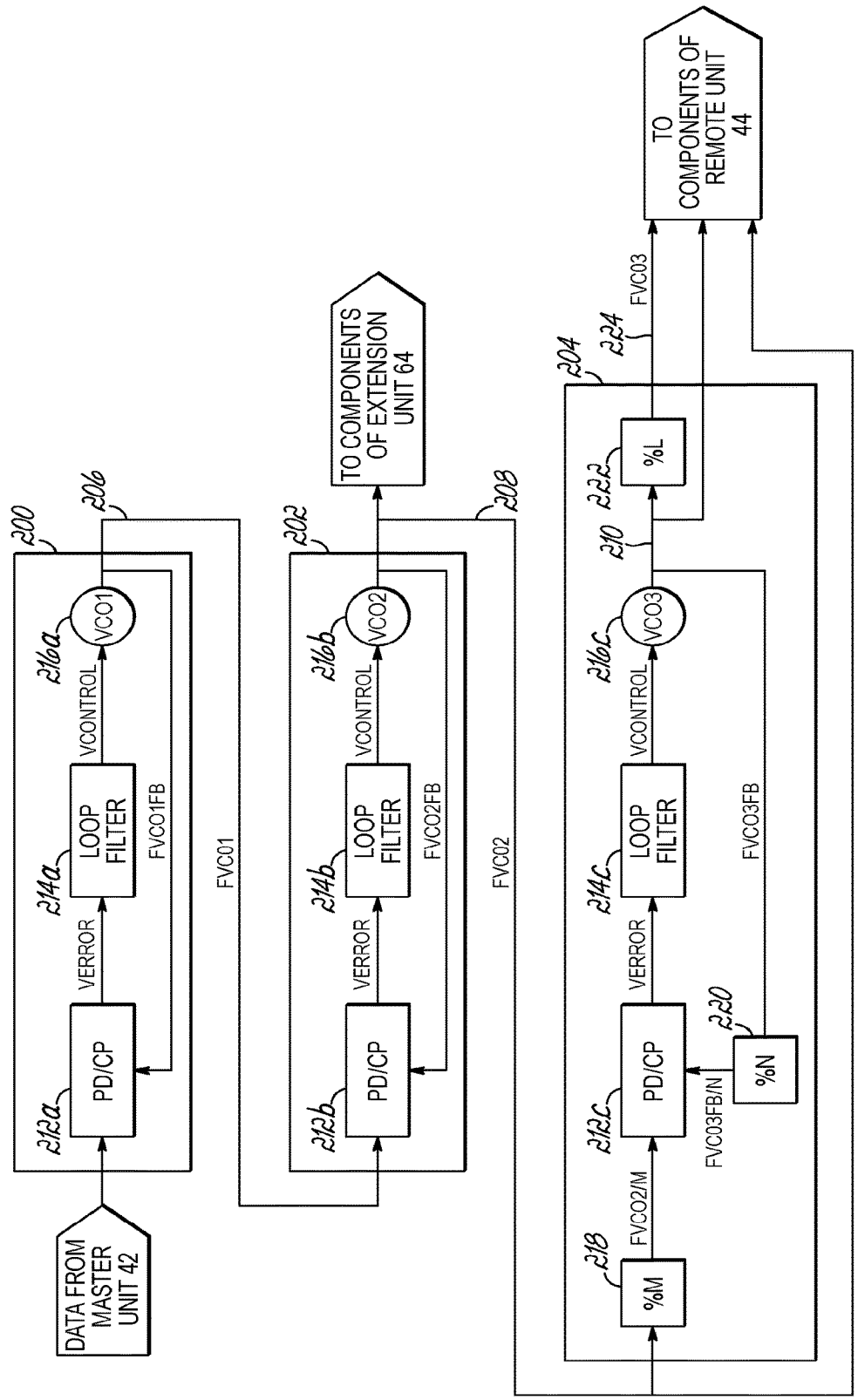
FIG. 6 is a block diagram of one embodiment of modules used to recover a clock signal in the remote unit or extension unit of the distributed antenna system of FIG. 2.

FIG. 6 illustrates a detailed block diagram of at least a portion of a clock recovery circuit 200 that may be included in the PHY 90 or 110, at least a portion of a noise filtering circuit 202 that may be included in the jitter reduction circuit 94 or 116, and at least a portion of a clock scaling circuit 204 that may be included in the phase/divider circuit 96, as well as the interconnections therebetween. FIG. 6 further illustrates that the clock recovery circuit 200, the noise filtering circuit 202, and the clock scaling circuit 204 may be interconnected to recover a clock signal imposed on a data stream extracted from a modulated digital signal from a master unit 42. However, the invention is not limited to how the circuits 200, 202, 204 are arranged in one or more of the elements 90, 110, 94, 116, or 96 as illustrated in FIG. 4 and FIG. 5. Specifically, the clock recovery circuit 200 receives a stream of binary encoded data extracted from a modulated signal and generates a recovered clock signal as at 206 (e.g., that may correspond to the recovered clock signal 92 or 112) based thereon. The recovered clock signal 206 is then processed by the noise filtering circuit 104 to reduce jitter and to produce a stable recovered clock signal as at 208 (e.g., that may correspond to the PHY reference for the extension unit 64 illustrated in FIG. 5). The stable recovered clock signal 208 advantageously has a phase and/or frequency corresponding to the phase and/or frequency of the oscillator 70 of the master unit that was used to clock the data received by the clock recover circuit 200. The clock scaling circuit 204, in turn, may be used to generate one or more scaled clock signals (e.g., such as the LO reference, the sampling clock signal, the PHY reference, and/or the CPU CLK) as at 210 for use in operating a remote unit 44. In specific embodiments, the clock recovery circuit 200, noise filtering circuit 202, and clock scaling circuit 204 may be implemented with a phase locked loop that each includes a phase-frequency detector charge pump 212, a loop filter 214, and a voltage controller oscillator (VCO) 216. Alternatively, the VCO 216 may be implemented as an LC tank circuit that includes at least one voltage controlled capacitor.

Referring to the clock recovery circuit 200, the phase-frequency detector charge pump 212*a* may compare a rising edge of a pulse within the received binary encoded data stream from the master unit 42 with a rising edge of a pulse received as a feedback signal from the VCO 216*a* (illustrated as FVCO1FB). The phase-frequency detector charge pump 212*a* then produces a frequency error signal (illustrated as VERROR) that is representative of both the sign and scale to the phase and/or frequency difference detected by the phase-frequency detector charge pump 212*a* between the encoded binary data input signal from the master unit 42 and the feedback signal FVCO1FB. The loop filter 214*a* then receives and integrates the frequency error signal VERROR to generate a smoothed VCO control signal (illustrated as VCONTROL) that is passed to the VCO 216*a*. VCO 216*a* of the clock recovery circuit 200, in turn, generates the recovered clock signal 206. The recovered clock signal 206 has a frequency that is proportional to the VCO control signal VCONTROL such that the recovered clock signal 206 is locked in phase and/or frequency to the oscillator 70 used by the master unit 42 to clock the binary encoded data stream into the modulated signal therefrom.

In some embodiments, however, the recovered clock signal 206 may exhibit jitter and/or other noise, as noted above. As such, the noise filtering circuit 202 is configured to process the recovered clock signal 206 through a second PLL to reduce jitter and provide the functionality of a jitter reduction circuit. In one embodiment, the PLL for the noise filtering circuit 202 is substantially similar to the PLL for the clock recovery circuit 200. The output of the noise filtering circuit 202, however, is the stable recovered clock signal 208 that is locked in phase and/or frequency to that of the recovered clock signal 206 and that, in turn, matches the phase and/or frequency of the oscillator 70 of the master unit 42, but that does not include jitter and/or noise accumulated between the clock recovery circuit 200 and the master unit 42.

For example, the bandwidth of the PLL for the clock recovery circuit 200 is configured to be sufficiently wide to track short-term jitter (e.g., high frequency jitter), on data, as well as long-term drift of the oscillator 70. This assures that no data is filtered from the signal. Thus, the clock recovery circuit 200 is not configured to filter the long-term drift or the short-term jitter. The bandwidth of the noise filtering circuit 202, however, is configured to be narrower than the bandwidth of the clock recovery circuit 200 such that short-term jitter is filtered out without filtering out long-term drift in the reference signal from the oscillator 70. Thus, short-term jitter is not propagated to the VCO 216b through loop filter 214b, while long-term drift is, as shown in FIG. 6.

In alternative embodiments, the noise filtering circuit 202 may be replaced by a narrow band crystal filter to eliminate jitter in the recovered clock signal 206.

As illustrated in FIG. 6, the clock recovery circuit 200 and the noise filtering circuit 202 are not configured with dividers. As such, the circuits 200 and 202 are configured to produce respective output signals 206 and 208 that are phase and/or frequency matched to the phase and/or frequency of the signal received by the clock recovery circuit 200. However, in some embodiments, a frequency divider may be used at the input of the noise filtering circuit 202, at the feedback signal FVC02FB from the VCO 216b to the phase-frequency detector charge pump 212b, or at the output of the noise filtering circuit 202. Such dividers may be used to generate particular clock signals at particular frequencies. However, if no clock signals at particular frequencies are required, the clock scaling circuit 204 may not be included (e.g., such as illustrated for the extension unit 64 in FIG. 6).

When clock signals at particular frequencies are required, the stable recovered clock signal 208 may be further processed by the clock scaling circuit 204 to generate one or more clock signals (e.g., such as those signals illustrated as output by the phase/divider circuit 96 in the remote unit 44 in FIG. 5). In specific embodiments, the PLL for the clock scaling circuit 204 is substantially similar to the PLL for the noise filtering circuit 202 and the clock recovery circuit 200, and includes a loop filter 214c. But the clock scaling circuit 204 may include, or otherwise be coupled to, signal dividers such that an output signal has a different output frequency from, but locked to, the stable recovered clock signal 208.

As illustrated in FIG. 6, a first signal frequency divider 218 (illustrated as "% M") receives the stable recovered clock signal 208 and generates an input signal for the phase-frequency detector charge pump 212c (illustrated as "FVC02M") that is a fraction of the stable recovered clock signal 208. Additionally, a second signal frequency divider 220 (illustrated as "% N") may receive a scaled clock signal 210 from the VCO 216c to feed back to the phase-frequency detector charge pump 212c to increase the frequency of that signal above that of the input signal FVC02M. A third signal frequency divider 222 (illustrated as "% L") may also receive a scaled clock signal from the VCO 216c to reduce the frequency of that scaled clock signal. Consistent with one embodiment of the invention, the clock scaling circuit 204 is configured to lock onto a stable recovered clock signal 208 of about 156.25 MHz and produce a scaled clock signal 210 of about 800 MHz. The third signal frequency divider 222, in turn, is used to generate an output signal 224 of about 100 MHz signal from the scaled clock signal 210 of about 800 MHz. Thus, scaled clock signal 210 may be about five times the stable recovered clock signal 208, while the scaled clock signal 210 may be about eight times the output signal 224.

In some embodiments, the second signal frequency divider 220 may be matched to the increase in the frequency applied by the VCO 216c to the input signal FVC02M such that the VCO feedback signal (illustrated as VFV03FB) is frequency locked to the input signal FVC02M. Equations 1 through 3 illustrate this relationship.

$$FVC02/M = \frac{FVCO2}{M} \qquad \text{EQ. 1}$$

$$FVC03 = FVCO2/M * N = FVC02 * N/M \qquad \text{EQ. 2}$$

$$FVC03FB = \frac{FVC03}{N} = \frac{FVC02}{M} \qquad \text{EQ. 3}$$

Thus, and with reference to Equation 2, inserting the first signal frequency divider 218 prior to the feedback loop allows the generation of the scaled clock signal 210 with a frequency that is proportional to the scaled recovered clock signal 208 as determined by the ratios of the first signal frequency divider 218 and the second signal frequency divider 220. The second signal frequency divider 220 may be a fractional N divider to permit flexibility in selecting the clock frequency.

Figure 7:
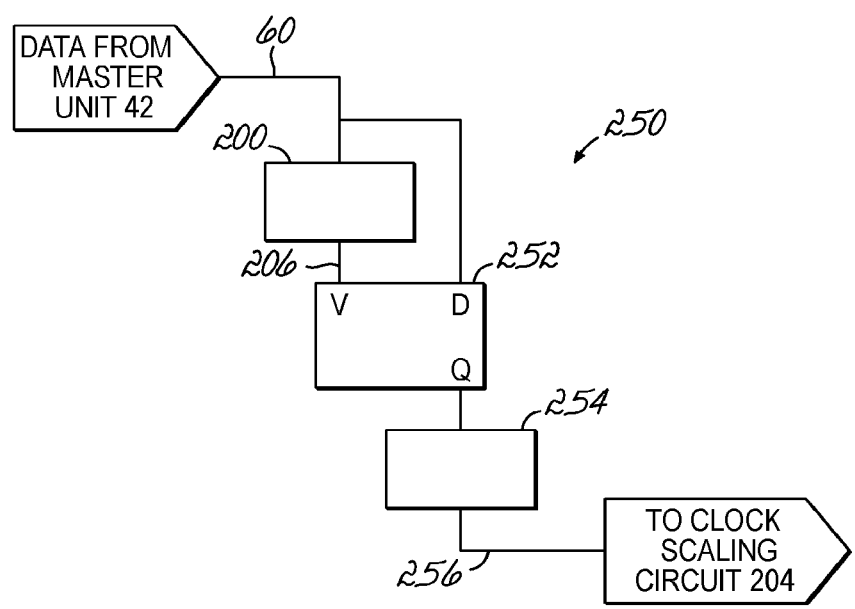
FIG. 7 is a block diagram of an alternative embodiment of modules used to recover a clock signal in the remote unit or extension unit of the distributed antenna system of FIG. 2.

Specifically, FIG. 7 illustrates at least a portion of a circuit 250 that may be used to recover a clock signal from a bit stream of data consistent with alternative embodiments of the invention.

As an alternative implementation of the jitter reduction process of the invention, the FPGA or other processor in a remote unit can provide a signal aligned with a periodic signal present in the serial data that could be used in place of the recovered clock as a reference for the oscillator.

In one example, the circuit 250 includes the clock recovery circuit 200 that generates the recovered clock signal 206 from an encoded data stream. The data and the recovered clock signal 206 are applied to a D flip-flop circuit 252 with the data applied to the D input thereof and the recovered clock signal 206 applied to the clock input thereof. The Q output of the D flip-flop circuit 252, in turn, is provided to a processor 254, such as an FPGA, that is configured to produce a signal as at 256 based on a detected periodic signal that is used to adjust the frequency of the oscillator at 258. The signal 256 generated by the processor is based on processed data clocked in from data lines using the recovered clock signal 206. It is developed by averaging the rate of the detected periodic signal sync component as determined by the processor. In such an embodiment, the noise filtering circuit 202 is not required. This reference signal 260 may then be supplied to a clock scaling circuit 204 to generate clock signals. This approach can use any periodic component of the encoded data stream.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. Thus, the invention in its broader aspects is therefore not limited to the specific details, representative apparatus and method, and illustrative examples shown and described. Accordingly, departures may be made from such details without departing from the scope of the general inventive concept.

What is claimed is:
1. A system, comprising:
a unit circuitry configured to communicate a modulated signal via a signal interface; and at least one additional unit circuitry configured to receive the modulated signal from the unit circuitry, the at least one additional unit circuitry including:
circuitry configured to remove jitter from a recovered clock signal to generate a jitter reduced clock signal that tracks long-term drift in the modulated signal, wherein the at least one additional unit circuitry is configured to generate the recovered clock signal from the modulated signal.

2. The system of claim 1, wherein the circuitry includes at least one of a phase-locked loop, a frequency-locked loop, or a narrowband filter.

3. The system of claim 1, further comprising scaling circuitry configured to scale a frequency of the recovered clock signal to generate an output signal at a predetermined target frequency.

4. The system of claim 1, wherein the signal interface is coupled to a communication medium, between the unit circuitry and the at least one additional unit circuitry, having at least one twisted pair cable.

5. The system of claim 1, the unit circuitry further including:
RF transceiver circuitry configured to communicate with a base transceiver station;
an auxiliary interface configured to communicate at least one of control data, maintenance data, Ethernet data, or WiFi data; and
a processor configured to multiplex data from the RF transceiver circuitry and the auxiliary interface for transmission to the at least one additional unit circuitry via the signal interface, the processor further configured to de-multiplex data received from the signal interface for transmission to the base transceiver station via the RF transceiver circuitry.

6. The system of claim 1, wherein the signal interface includes at least a one gigabit per second (Gbps) Ethernet interface.

7. The system of claim 6, wherein the Ethernet interface is synchronous.

8. A unit circuitry for use in a system comprising:
a signal interface configured to couple the unit circuitry to an additional unit circuitry of the system and to transceive a modulated signal with the additional unit circuitry; and
circuitry configured to generate a jitter reduced clock signal by removing jitter from a recovered clock signal while allowing the jitter reduced clock signal to track long-term drift in the modulated signal, wherein the unit circuitry is configured to generate a recovered clock signal from the modulated signal.

9. The unit circuitry of claim 8, wherein the circuitry includes at least one of a phase-locked loop, a frequency-locked loop, or a narrowband filter.

10. The unit circuitry of claim 8, further comprising scaling circuitry configured to scale a frequency of the recovered clock signal to generate an output signal at a predetermined target frequency.

11. The unit circuitry of claim 8, further comprising:
RF transceiver circuitry configured to communicate cellular and non-cellular data with a subscriber unit;
an auxiliary interface configured to communicate at least one of control data, maintenance data, Ethernet data, or WiFi data; and
a processing unit configured to de-multiplex data from the signal interface for transmission by the RF transceiver circuitry or the auxiliary interface, the processing unit is further configured to multiplex data from the RF transceiver circuitry and the auxiliary interface for transmission on the signal interface.

12. The unit circuitry of claim 8, wherein data communicated to the unit circuitry via the signal interface includes at least one of digitized RF cellular voice data, digitized RF non-cellular voice data, digitized RF cellular data, digitized RF non-cellular data, control data, maintenance data, Ethernet data, or WiFi data.

13. The unit circuitry of claim 8, wherein the signal interface includes at least a one gigabit per second (Gbps) Ethernet interface.

14. The unit circuitry of claim 11, wherein the processing unit is configured to adjust the rate of data being transmitted on the signal interface to match the capability of that signal interface.

15. The unit circuitry of claim 13, wherein the Ethernet interface is synchronous.

16. A method comprising:
receiving a modulated signal using a signal interface; and
generating a jitter reduced clock signal by removing jitter from a recovered clock signal while allowing the jitter reduced clock signal to track long-term drift in the modulated signal, wherein the recovered clock signal is generated from the modulated signal.

17. The method of claim 16, further comprising generating the jitter reduced clock signal by filtering the recovered clock signal using at least one of a phase-locked loop, a frequency-locked loop, or a narrowband filter.

18. The method of claim 16, further comprising scaling a frequency of the jitter reduced clock signal to produce at least one scaled clock signal.

19. The method of claim 16, wherein receiving the modulated signal comprises receiving the modulated signal using at least a one gigabit per second (Gbps) Ethernet interface.

20. The method of claim 16, wherein the communication medium is a communication cable having at least one twisted pair cable.

* * * * *